United States Patent Office 3,663,503

Patented May 16, 1972

3,663,503

COLORLESS, COLD CURE PHENOLIC RESIN CONTAINING SULFUR STABILIZERS

Rudolf H. E. Klemke, Sparta, N.J., assignor to Mohawk Industries Inc., Sparta, N.J.

No Drawing. Filed Feb. 25, 1970, Ser. No. 14,178
Int. Cl. C08g 51/60
U.S. Cl. 260—45.8 N 3 Claims

ABSTRACT OF THE DISCLOSURE

The specification discloses a phenolic resin composition comprising an organic compound having an S═C moiety which composition can be cold cured to a colorless or white product and a method for providing a colorless or white cold cured phenolic resin composition by incorporating in the resin an organic compound characterized by the presence of a C═S group and then curing the resin with a strong organic acid.

This invention relates to phenolic resins and more particularly to color-stabilized cold-cured resins, to phenolic resin glues which can be cured by means of an acid catalyst to provide a white or colorless condensation product, and to a process for providing undiscolored cured phenolic compositions.

Phenolic resins are among the most versatile of the many plastic materials. These resins can be provided in many forms each having physical and chemical properties which make it uniquely suitable for a particular purpose. One such purpose is to provide an adhesive which can be spread on a surface and then cured to form a permanent adherent bond. One of the significant problems associated with phenolics is a lack of stability with respect to color. Phenolic resins are known to develop undesirable colors which render them unsuitable for many uses, particularly where the resin is used for some decorative purpose. For example, phenolic resins have been found to develop, during curing, a deep color which might range from yellow to red. This color development is particularly objectionable in phenolic resin glues.

Accordingly, it is an object of the invention to provide phenolic resins having improved color characteristics.

Another object of the invention is to provide a method for stabilizing phenolic resins against discoloration.

A further object of the invention is to provide phenolic resin of enhanced color stability.

A still further object of the invention is to provide curable phenolic resin composition, which can be used to provide color-stable end products.

Another object of the invention is to provide phenolic compositions which can be cold cured without discoloration.

A further object of the invention is to provide cold curable phenolic resin glues which are white or substantially colorless.

Another object of the invention is to provide a method for decolorizing phenolic resins during cold cure.

A particular object of the invention is to provide a method and compositions for cold curing phenolic resins.

These and other related objects are achieved by curing phenolic resins, in the presence of a color stabilizing amount of a thione compound, with a curing amount of a strong organic acid. It has been found that when a curable phenolic resin composition, containing an effective amount of a thione, is cold cured by means of a strong organic acid catalyst, discoloration is substantially avoided and a white or substantially colorless cured composition is obtained.

The term "effective amount" as used herein, including the appended claims, refers to an amount of thione which is capable of substantially preventing development of discoloration during cold curing of phenolic resin compositions. Similarly, a "color stabilizing" amount of a thione is one which will provide a cured composition which is substantially the color equivalent of the curable composition, i.e., one which is substantially free of yellowish, orangish, or reddish colors developed in the material during curing. These color stabilized compositions have been found to provide excellent resol glues which can be used to laminate decorative materials on light colored woods and natural products.

Phenolic resins are well known and are prepared by acid or basic condensations of a phenolic compound with an aldehyde, the most common pair of reactants being phenol and formaldehyde. Many factors, including the reactants themselves, can be varied to provide resins of varying properties. Among the more significant variables are the amount of catalyst on the pH of the reaction mass, the ratio of hydroxyl function to aldehyde function, and the use of fillers or modifiers.

The thione compounds, which are the stabilizers of this invention, are characterized by a thione group, i.e., the S═C group. They can be added to the reaction mixture before the initial condensation or resnification begins or subsequently, i.e., after some condensation has taken place. The significant requirement being that the thione compound be present during cure, that is, the step which converts the resin to a high enough level of polymerization to perform its function, be it that of a glue or a molded article. It is generally desirable that the thione compound be present in the reaction medium before any significant degree of discoloration has developed. The thione compound can be incorporated into the phenolic-aldehyde mixture before polymerization has been initiated or it can be incorporated into the resin or partially polymerized reaction product.

The thione compounds can be selected from the aliphatic and aromatic thiones, such as the thioketones, thioesters, and others having the requisite C═S group.

Specific illustrative compounds include thiourea and C═S containing derivatives of thiourea, diphenylthiourea, thiazolidine-2-thione, 2-thiobarbituric acid, thiosemicarbazide, and the like.

The thione compound is to be employed in an amount which is capable of stabilizing the resin with respect to the curing conditions employed. This amount which for convenience can be called an effective amount may vary depending on the choice of a particular combination of phenolic compound and aldehyde as well as the parameters of the cure and the conditions to which the cured product will be subjected. Broadly, the amount of thione should be from about 0.2 to about 5 percent by weight, based on the weight of resin. In general, the amount of thione can be from about 0.001 to about 1 mole per mole of phenolic. Suitable results have been achieved with thione-phenol molar ratios as low as from about 0.03 to about 0.05.

The actual amount of thione needed to produce any desired degree of stabilization can be easily determined by those in the art in the same manner employed to systematically evaluate variations in the many other factors which affect the preparation and cure of phenolic resins, for example, the ratio of phenolic to aldehyde, use of various fillers, choice of catalyst, and curing conditions. There are many factors which can be deliberately varied to provide reaction products of special characteristics.

In connection with the use of the herein disclosed stabilizers, the technology conventionally associated with phenolic resins is applicable. In general, this invention is applicable to condensation products, preferably alkaline catalyzed, of phenolic compounds such as the alkyl phenols, e.g., the cresols, the xylenols, resorcinol, p-phenyl-phenol, p-tert-butylphenol, and the like, and mixtures thereof. Illustrative aldehydes include formaldehyde, acetaldehyde, furfural, and the like. Formaldehyde can be employed in the form of Formalin solutions or as a paraform polymer.

The phenolic compound is generally blended with from about 1 to 3 moles of aldehyde and the condensation reaction catalyzed with a hydroxide of an alkali or alkaline earth metal.

In preparing the resol stage resin to be cold cured, it is desirable to conduct the initial condensation reaction under conditions which provide a resol resin having a pH of between 6.5 and 7. Excess alkalinity can be neutralized in accordance with conventional practice prior to addition of the cold cure catalyst.

The thione-containing resin is then cold cured by well-known techniques using a strong organic acid as a catalyst. It is desirable that the catalyst be one that does not aggravate the discoloration problem, for example, by self-discoloration. Accordingly, p-toluenesulfonic acid and the o- and p-phenolsulfonic acids are not preferred catalysts.

Suitable hardeners are well known in the art and those having a pH of about 2 or lower are illustrative of strong organic acids which can be used in conjunction with this invention. In carrying out the cold cure step, it is desirable to use sufficient organic acid to reduce the pH of the mixture to about 2.

Illustrative organic acid catalysts include monochloroacetic acid, dichlor acetic acid, trichlor acetic acid, formic- and oxalic acid, and aliphatic sulfonic acids.

EXAMPLE 1

Two moles of phenol, 5.4 moles of formaldehyde, 10 grams of thiourea, and 3.0 ml. of 50% aqueous sodium hydroxide were placed in a 500 ml. flask fitted with a thermometer, a stirrer and a condenser. The admixture had a pH of 8 to 8.3 and was slowly heated to reflux, about 100° C. and held a reflux for a period of about 45 minutes, at which point the pH of the mixture was found to be about 7.3 and it had a viscosity of about 270 cps. at 20° C. One hundred and twenty mls. of water were distilled off by means of an aspirator vacuum at 12 mm. of Hg. The resulting reaction product was cooled to room temperature and the final viscosity found to be about 14,240 cps. at 20° C.

Ten parts of the reaction product were cold mixed with 3 parts of a 70% aqueous solution of chloroacetic acid. The mixture which was slightly yellow at the start turned from violet to gray to colorless during the following pot life schedules:

20° C.—4.0 hours
50° C.—10–15 minutes
90° C.—2–3 minutes.

EXAMPLE 2

Following the procedure of Example 1, a mixture containing 10 grams of thiazolidine-2-thione, 188 grams of phenol, 324 grams of 50% formaldehyde and 3 mls. of 50% sodium hydroxide were reacted to form a resol resin having a final pH of about 6.2 and a viscosity of 15,360 cps. at 20° C.

The resulting resol was cold cured with monochloroacetic to form a colorless cured composition.

EXAMPLE 3

A mixture containing 10 grams of 2-thiobarbituric acid, 188 grams of phenol, 324 grams of 50% formaldehyde, and 7 ml. of sodium hydroxide was stirred until a clear solution having a pH of about 7.8 was obtained. The solution was reacted, as described in Example 1, for about 30 minutes at which point it had a pH of about 7.4 and a viscosity of about 85.8 cps. at 20° C. After stripping off 110 ml. of water, the resulting resol had a viscosity of about 6,320 cps. at 20° C.

The resulting resol resin was cold cured with monochloroacetic acid to a colorless product, as described in Example 1.

The foregoing examples have been directed to unfilled phenolic liquid resins because the benefits derived from this invention are more clearly seen in the absence of fillers. However, a compatible conventional additives such as fillers, lubricants, dyes, pigments, and solvents can be used in the resins of this invention.

I claim:

1. A color-stable, cold-curable phenolic resin composition comprising a partially cured phenolic-aldehyde condensation product and a color-stabilizing amount of a compound selected from the group consisting of diphenylthiourea, thiosemicarbozide, thiazolidine-2-thione, 2-thiobarbituric acid, and thiourea.

2. The composition of claim 1 wherein said color-stabilizing amount is from about 0.2 to about 5 weight percent, based on the weight of the phenolic resin.

3. The composition of claim 1 wherein said curable composition comprises a phenol-formaldehyde condensation product.

References Cited

UNITED STATES PATENTS 3,418,273 12/1968 Economy et al. ..... 260—45.75

OTHER REFERENCES

"Polymer Processes," by Shildnecht, vol. X, 1956 edition, Intersciene Publ. Inc., N.Y., p. 312.

DONALD E. CZAJA, Primary Examiner

V. P. HOKE, Assistant Examiner

U.S. Cl. X.R.

260—45.9 R, 45.8 SN